US006991663B2

(12) United States Patent
Abe

(10) Patent No.: US 6,991,663 B2
(45) Date of Patent: Jan. 31, 2006

(54) HYDROGEN-RICH GAS SUPPLY DEVICE FOR FUEL CELL

(75) Inventor: Mitsutaka Abe, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 343 days.

(21) Appl. No.: 09/949,880

(22) Filed: Sep. 12, 2001

(65) Prior Publication Data

US 2002/0029522 A1 Mar. 14, 2002

(30) Foreign Application Priority Data

Sep. 12, 2000 (JP) ............................... 2000-276342

(51) Int. Cl.
*C10J 3/68* (2006.01)
*H01M 8/00* (2006.01)
*H01M 8/04* (2006.01)

(52) U.S. Cl. ............................... 48/76; 429/13; 429/22; 429/24

(58) Field of Classification Search .................... 48/61, 48/127.1, 127.3, 127.7, 127.9, 198.1, 198.3, 48/199 FM, 197 FM
See application file for complete search history.

(56) References Cited

U.S. PATENT DOCUMENTS 4,046,956 A * 9/1977 Fanciullo ...................... 429/20
5,658,681 A * 8/1997 Sato et al. .................... 429/13
6,232,005 B1 5/2001 Pettit ............................ 429/19
6,309,768 B1 * 10/2001 Patterson et al. ............. 429/13

FOREIGN PATENT DOCUMENTS

| EP | 0 833 401 | 4/1998 |
|---|---|---|
| EP | 0 941 963 | 9/1999 |
| EP | 0 955 351 | 11/1999 |
| JP | 5-303970 | 11/1993 |
| JP | 5-303970 A | 11/1993 |
| JP | 8-119602 A | 5/1996 |
| JP | 8-133701 | 5/1996 |
| JP | 8-133702 A | 5/1996 |
| JP | 10-324501 A | 12/1998 |
| JP | 11-67256 | 3/1999 |
| JP | 2000-63104 | 2/2000 |

* cited by examiner

*Primary Examiner*—Glenn Caldarola
*Assistant Examiner*—Tom P. Duong
(74) *Attorney, Agent, or Firm*—Foley & Lardner LLP

(57) ABSTRACT

To generate hydrogen-rich gas which is supplied to a fuel cell stack (2) of a fuel cell power plant, a reformer (1) generates reformate gas comprising hydrogen from methanol, and a carbon monoxide oxidizer (3) oxidizes carbon monoxide from the reformate gas by an action of a catalyst incorporated therein. A valve (10) which supplies hot gas, and a valve (18) which supplies air are provided. When the catalyst temperature is lower than a predetermined temperature, hot gas is supplied from the valve (10) to the oxidizer (3). Due to the heat of oxidation of carbon monoxide by the air supplied by the valve (18) and the high temperature of the hot gas, the temperature of the catalyst rises rapidly after start-up of the power plant.

7 Claims, 12 Drawing Sheets

HYDROGEN-RICH GAS SUPPLY DEVICE FOR FUEL CELL

FIELD OF THE INVENTION

This invention relates to a hydrogen-rich gas supply device for a fuel cell.

BACKGROUND OF THE INVENTION

Tokkai Hei 2000-063104 published by the Japanese Patent Office in 2000 discloses a hydrogen-rich gas supply device which supplies hydrogen-rich gas required for the reactions of the fuel cell by the reforming of fuel such as gasoline or methanol. This device comprises a reformer, carbon monoxide oxidizer and a vaporizer.

An oxidation catalyst is built into the carbon monoxide oxidizer The oxidation catalyst oxidizes carbon monoxide in the reformate gas obtained from the reformer and decreases the carbon monoxide concentration in the reformate gas. In order to activate the oxidation catalyst in a low temperature state, a burner is provided upstream of the oxidizer. In the burner, sprayed fuel is ignited by a glow plug, and the combustion gas produced by the combustion of fuel is introduced into the oxidizer.

Tokkai Hei 11-67256 published by the Japanese Patent Office in 1999 discloses a method in which high temperature air heated by heat exchange with combustion gases, is introduced into the oxidizer.

Tokkai Hei 8-133701 published by the Japanese Patent Office in 1996 discloses a method wherein oxidation of reformate gas is promoted by supplying air together with reformate gas to the carbon monoxide oxidizer.

The heat due oxidation of reformate gas assists the activation of the catalyst.

SUMMARY OF THE INVENTION

In the devices disclosed in Tokkai Hei 5-3 03970 and Tokkai Hei 11-6 7256, the interior of the carbon monoxide oxidizer becomes hot locally due to the combustion gas or hot gas, so it is possible that part of the oxidation catalyst at high temperature sinters, and the activation of the catalyst is adversely affected.

In the device of Tokkai Hei 8-133701, the amount of components in the reformate gas that can be oxidized by the oxidation catalyst is small at the operation start-up of the power plant, so the heat amount due to oxidation of reformate gas is also small. As a result, the time until the catalyst reaches activation temperature due to the heat of oxidation, is long.

It is therefore an object of this invention to activate the oxidation catalyst in the carbon monoxide oxidizer in a short time.

In order to achieve the above object, this invention provides a hydrogen-rich gas supply device for supplying hydrogen-rich gas to a fuel cell stack. The device comprises a reformer which generates reformate gas comprising hydrogen from fuel, a carbon monoxide oxidizer comprising a catalyst which oxidizes carbon monoxide contained in the reformate gas, an oxidizing agent supply mechanism which supplies an oxidizing agent to the carbon monoxide oxidizer, a hot gas supply mechanism which supplies hot gas to the carbon monoxide oxidizer, a sensor which detects a temperature of the catalyst, and a controller functioning to determine whether or not the temperature of the catalyst is higher than a predetermined temperature, and stop the hot gas supply mechanism supplying hot gas to the carbon monoxide oxidizer when the catalyst temperature is higher than the predetermined temperature.

This invention also provides a hydrogen-rich gas supply device comprising a reformer which generates reformate gas comprising hydrogen from fuel, a carbon monoxide oxidizer comprising a catalyst which oxidizes carbon monoxide contained in the reformate gas, an oxidizing agent supply mechanism which supplies an oxidizing agent to the carbon monoxide oxidizer, a hot gas supply mechanism which supplies hot gas to the carbon monoxide oxidizer, and a controller functioning to determine whether or not a predetermined time has elapsed from when the reformer started generating the reformate gas, and stop the hot gas supply mechanism supplying hot gas to the carbon monoxide oxidizer when the predetermined time has elapsed.

The details as well as other features and advantages of this invention are set forth in the remainder of the specification and are shown in the accompanying drawings.

DESCRIPTION OF THE PREFERRED EMBODIMENTS

Figure 1:
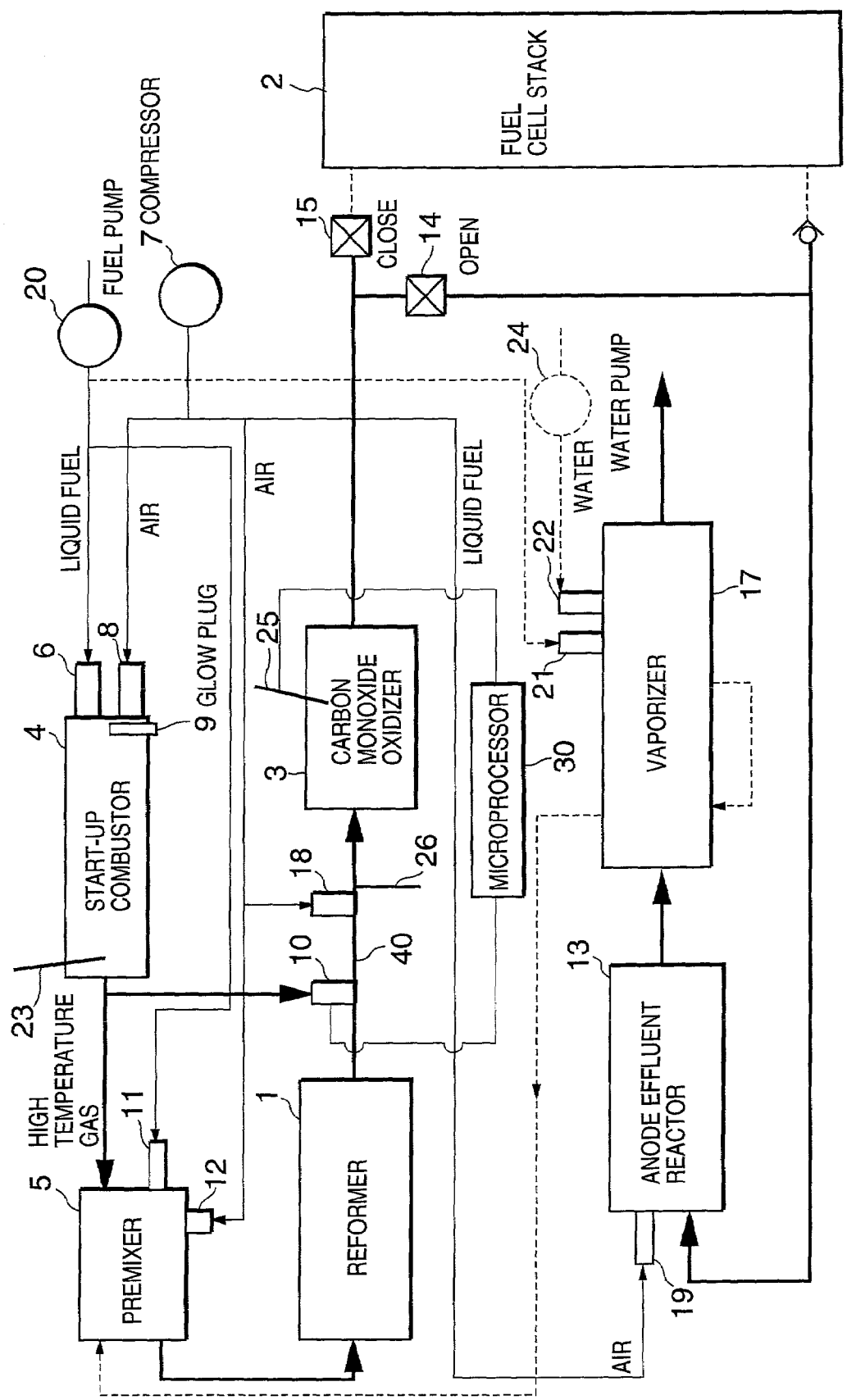
FIG. 1 is a schematic diagram of a fuel cell power plant with a hydrogen-rich gas supply device according to this invention showing an operation state during start-up of the fuel cell power plant.

Referring to FIG. 1 of the drawings, a hydrogen-rich gas supply device according to this invention forms part of a fuel cell power plant using a fuel cell stack 2, and is provided in order to supply hydrogen-rich gas to the fuel cell stack 2.

The fuel cell stack 2 comprises a polymer electrolyte fuel cell. The fuel cell stack 2 comprises an anode chamber and cathode chamber formed on both sides of a membrane electrode assembly. The membrane electrode assembly comprises an anode, a cathode, catalyst layers and an electrolyte gripped between the catalyst layers. Hydrogen-rich gas is supplied to the anode chamber via a valve 15, causes a power generating reaction known in the art to occur on the way to the cathode chamber via the catalyst layer and electrolyte, and reacts with oxygen supplied to the cathode chamber to form water.

The hydrogen-rich gas supply device comprises a premixer 5 which vaporizes methanol which is a source fuel, a reformer 1 which generates reformate gas by reforming the vaporized methanol, a carbon monoxide oxidizer 3 which generates hydrogen-rich gas by removing carbon monoxide from the reformate gas produced by the reformer 1, an anode effluent reactor 13 which burns hydrogen containing anode effluent in the anode chamber, a vaporizer 17, and a start-up combustor 4 which supplies hot combustion gas when the power plant is starting up.

The hydrogen-rich gas supply device forms different hydrogen-rich gas supply paths when the power plant is running in a steady state and when it is starting up.

The bold line in FIG. 1 shows the hydrogen-rich gas supply path during start-up of the power plant. Methanol fuel stored in a fuel tank, not shown, is supplied to the start-up combustor 4 and the premixer 5 from a fuel pump 20.

Methanol fuel is introduced into the start-up combustor 4 via a pressure regulating valve 6, ignited and burnt by a glow plug 9 in the presence of air supplied from a compressor 7 via a pressure regulating valve 8, and generates hot combustion gas which is supplied to the premixer 5. A temperature sensor 23 is attached to the start-up combustor 4 to detect the temperature of the hot combustion gas. The temperature of the combustion gas produced by the start-up combustor 4 is suitably maintained by controlling the pressure regulating valves 6, 8 according to an output signal from the temperature sensor 23.

The premixer 5 comprises a fuel supply valve 11 which introduces methanol fuel from the fuel pump 20, and an air supply valve 12 which introduces air from the compressor 7. The premixer 5 vaporizes methanol fuel introduced from the fuel supply valve 11 and air introduced from the air supply valve 12 using combustion gas supplied from the start-up combustor 4, and supplies the product to the reformer 1 as vaporized fuel at a predetermined temperature.

The reformer 1 performs steam reforming and partial oxidation reforming as disclosed in U.S. Pat. No. 6,232,005. In the reformer 1, methanol is oxidized in the presence of an oxidation catalyst and generates hydrogen. This is the partial oxidation reforming. The partial oxidation reaction is an exothermic reaction. Further, in the reformer 1, methanol is reacted with steam and generates hydrogen. This is the steam reforming. The steam reforming is an endothermic reaction. Due to the combination of these reactions, reformate gas containing hydrogen is generated from methanol. In the steady running state of the power plant, the reformer 1 performs these two types of reforming in parallel, but when the power plant is starting up, steam is not supplied, and the temperature of the reformate gas is increased due only to partial oxidation reforming. The reformate gas due to the reformer 1 is supplied to the carbon monoxide oxidizer 3.

The carbon monoxide oxidizer 3 comprises a catalyst unit wherein a noble metal such as ruthenium (Ru) or platinum (Pt) is coated on a ceramic or metal honeycomb substrate together with alumina ($Al_2O_3$). This catalyst unit has the function of oxidizing carbon monoxide in a predetermined temperature range. The activation temperature of the catalyst unit is 100–200° C.

When the power plant starts up, the catalyst in the carbon monoxide oxidizer 3 is not activated, and does not function properly. Therefore, the carbon monoxide amount contained in the gas discharged from the carbon monoxide oxidizer 3 is high. To prevent high carbon monoxide content gas from flowing into the fuel cell stack 2, the valve 15 is closed when the power plant is starting up, and the whole amount of gas discharged from the carbon monoxide oxidizer 3 is supplied to the anode effluent reactor 13 via a valve 14. At this stage, the fuel cell stack 2 does not generate power, and the hydrogen-rich gas supply device is first controlled to increase the temperature of the reformer 1 and carbon monoxide oxidizer 3.

The purpose of the anode effluent reactor 13 is to prevent hydrogen from the anode chamber of the fuel cell stack 2, from being discharged into the atmosphere.

However, when the power plant is starting up, gas which is discharged from the carbon monoxide oxidizer 3 directly enters the anode effluent reactor 13 from the valve 14. The gas led to the anode effluent reactor 13 from the carbon monoxide oxidizer 3 causes a combustion reaction with the air introduced from an air supply valve 19 in the presence of the catalyst built into the anode effluent reactor 13. After being oxidized in the anode effluent reactor 13, the gas is discharged as a mixture of steam, carbon dioxide and nitrogen.

In the steady operation state of the power plant, methanol fuel from the fuel pump 20 which flows via a valve 21, and water from a water pump 24 which flows via a valve 22, are respectively led to the vaporizer 17. The vaporizer 17 has the role of vaporizing the methanol and water by the heat of the gas mixture from the anode effluent reactor 13, but when the power plant is starting up, the valves 21, 22 are closed.

A combustion gas supply valve 10 which takes in combustion gas from the start-up combustor 4 and an air supply valve 18 which takes in air from the compressor 7, are provided in a reformate gas passage 40 connecting the reformer 1 and the carbon monoxide oxidizer 3. A temperature sensor 25 which detects the temperature of the catalyst is provided in the carbon monoxide oxidizer 3, and a temperature sensor 26 which detects the temperature of the reformate gas is provided in the passage 40. The output signal of the sensor 25 is input to a microprocessor 30. Based on the output signal from the temperature sensor 25, the microprocessor 30 controls the opening of the combustion gas supply valve 10. After the power plant starts up, until the catalyst unit in the carbon monoxide oxidizer 3 has reached a predetermined temperature range, the combustion gas supply valve 10 is operated so that reformate gas from the reformer 1 and combustion gas from the start-up combustor 4 in the air supplied from the air supply valve 18, are mixed, and the mixed gas flows into the carbon monoxide oxidizer 3. These mixed gases are at high temperature, and contain a large amount of oxygen. The control of the combustion gas supply valve 10 performed by the microprocessor 30 will be described in detail later.

Due to this control, immediately after the power plant starts up, the catalyst unit in the carbon monoxide oxidizer 3 heats up directly due to the heat of the mixed gases. Also, the oxygen in the mixed gases oxidizes combustible components such as hydrogen and carbon monoxide in the reformate gas, and the catalyst is heated due to the heat of oxidation generated at this time. When the power plant starts up, the activation temperature of the oxidation catalyst of the reformer 1 is low, so the concentration of combustible components such as hydrogen and carbon monoxide contained in the reformate gas is also low. However, as the activation of the catalyst in the reformer 1 proceeds, the concentration of combustible gases in the reformate gas also increases.

Consequently, the heat of oxidation increases very rapidly after the power plant starts up, and the temperature of the catalyst unit in the carbon monoxide oxidizer 3 rapidly rises to the predetermined temperature range in which carbon monoxide can be oxidized.

Figure 2:
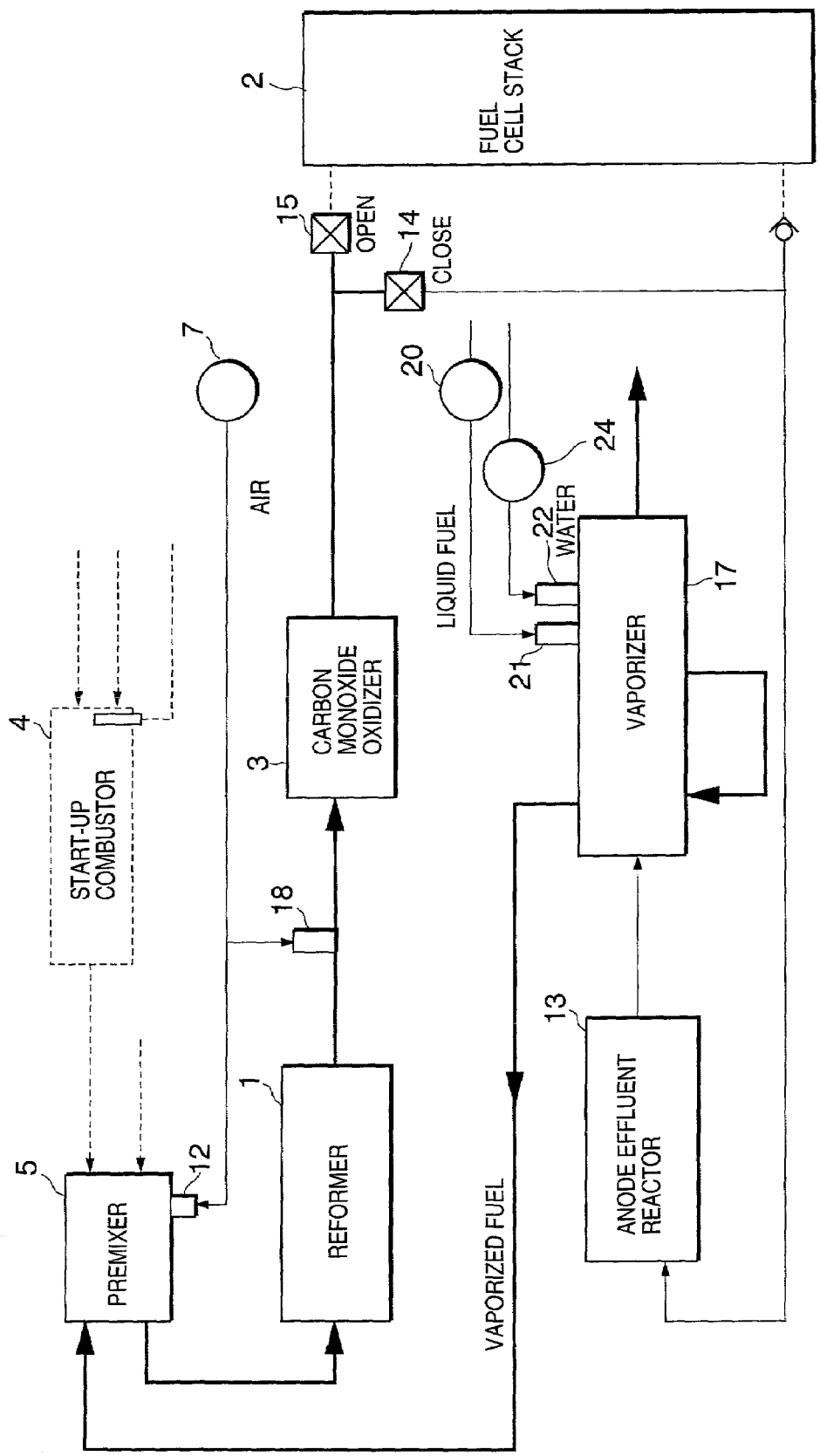
FIG. 2 is a schematic diagram of the fuel cell power plant with the hydrogen-rich gas supply device when the power plant is operating in the steady state.

Next, referring to FIG. 2, the hydrogen-rich gas supply path in the hydrogen-rich gas supply device during the steady running state of the power plant will be described.

When the power plant is running in the steady state, the start-up combustor 4 stops operating, and vaporized fuel and steam heated by the vaporizer 17 are supplied to the reformer 1 via the premixer 5.

Due to the aforesaid partial oxidation reforming and steam reforming, the reformer 1 generates reformate gas containing hydrogen from the vaporized methanol. In the steady running state, the combustion gas supply valve 10 is closed, and reformate gas together with air from the air supply valve 18 are supplied to the passage 40. In this hydrogen-rich gas supply device, when the power plant is operating, the air supply valve 18 is permanently maintained open.

The oxidation catalyst unit in the carbon monoxide oxidizer 3 is now active, and when the carbon monoxide contained in the reformate gas is reacted with the oxygen contained in the air, the carbon monoxide oxidizer 3 removes carbon monoxide from the reformate gas, and generates hydrogen-rich gas. The valve 14 is closed, and the hydrogen-rich gas is supplied to the anode chamber of the fuel cell stack 2 via the valve 15.

The hydrogen-rich gas supplied to the anode chamber of the fuel stack 2 is used for power generation in the fuel cell stack 2. The excess amount of hydrogen in the anode chamber is sent to the anode effluent reactor 13 as hydrogen containing anode effluent. The hydrogen containing anode effluent is burnt in the anode effluent reactor 13 to become high temperature gas mixture which heats the vaporizer 17.

In the vaporizer 17, methanol fuel is led via the valve 21 from the fuel pump 20, and water is led via the valve 22 from the water pump 24. The methanol and water are heated by the vaporizer 17, and supplied to the reformer 1 via a premixer 5 as shown by the bold line in the figure. The steam is used for reforming fuel in the reformer 1.

Figure 3:
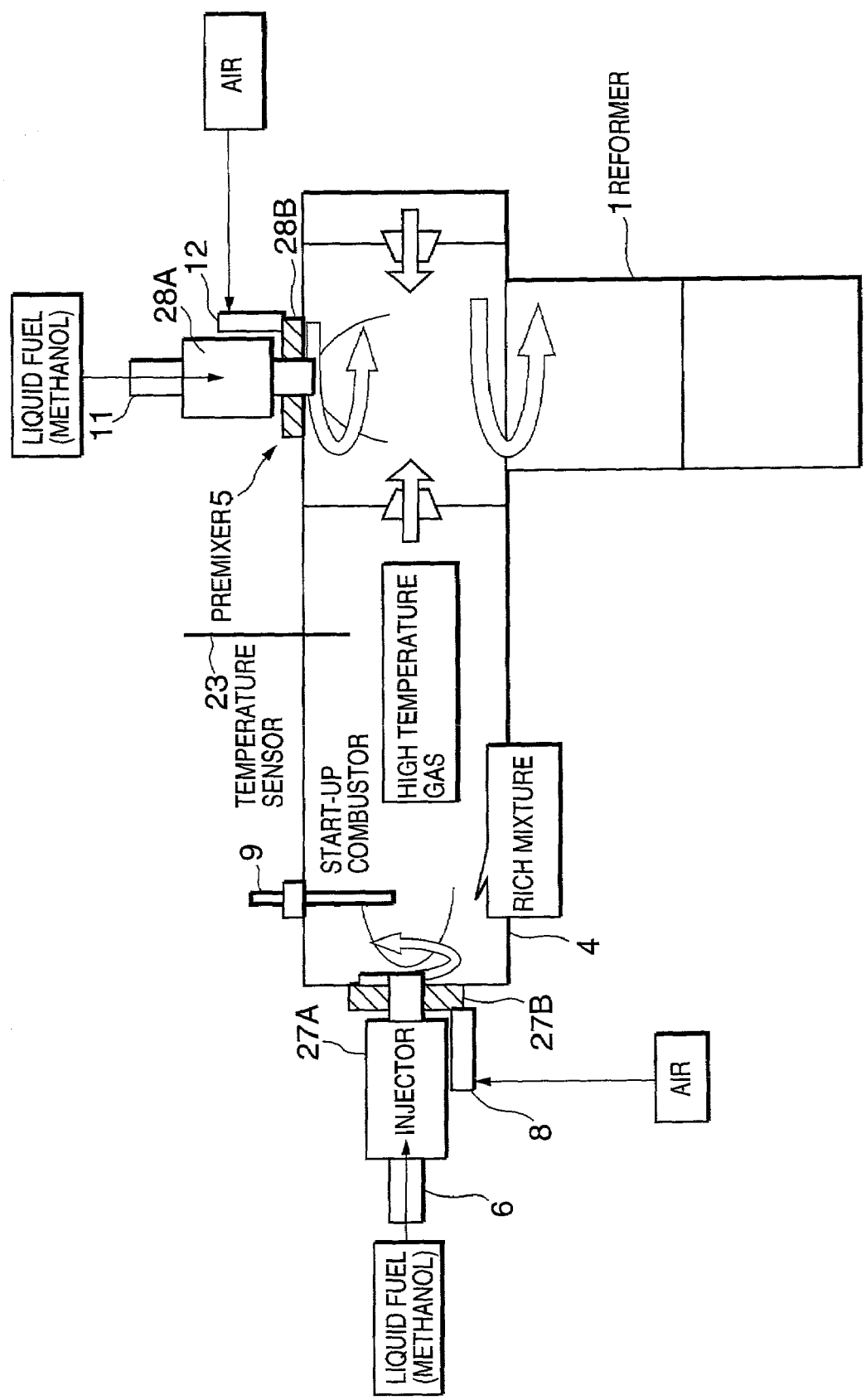
FIG. 3 is a schematic diagram of a start-up combustor, premixer and reformer according to this invention.

Next, the construction of the start-up combustor 4, premixer 5 and reformer 1 will be described referring to FIG. 3.

The methanol fuel supplied via the pressure regulating valve 6 from the fuel pump 21, is injected into the start-up combustor 4 by an injector 27A. Air supplied via the pressure regulating valve 8 from the compressor 7, is supplied to the start-up combustor 4 via a swirler 27B. The gaseous mixture of methanol and air is ignited by the glow plug 9, and hot combustion gas is produced due to the combustion. The temperature of this combustion gas is detected by the temperature sensor 23, so the temperature of the combustion gas can be controlled within a predetermined desirable range by adjusting the supply amount of fuel and air.

The combustion gas flows into the premixer 5. In the premixer 5, methanol fuel from the fuel supply valve 11 is injected via an injector 28A. Air is also supplied via an air supply valve 12 and swirler 28B. The supplied fuel vaporizes due to the heat of the combustion gas, and a mixture of vaporized fuel, air and combustion gas is supplied to the reformer 1.

Figure 4:
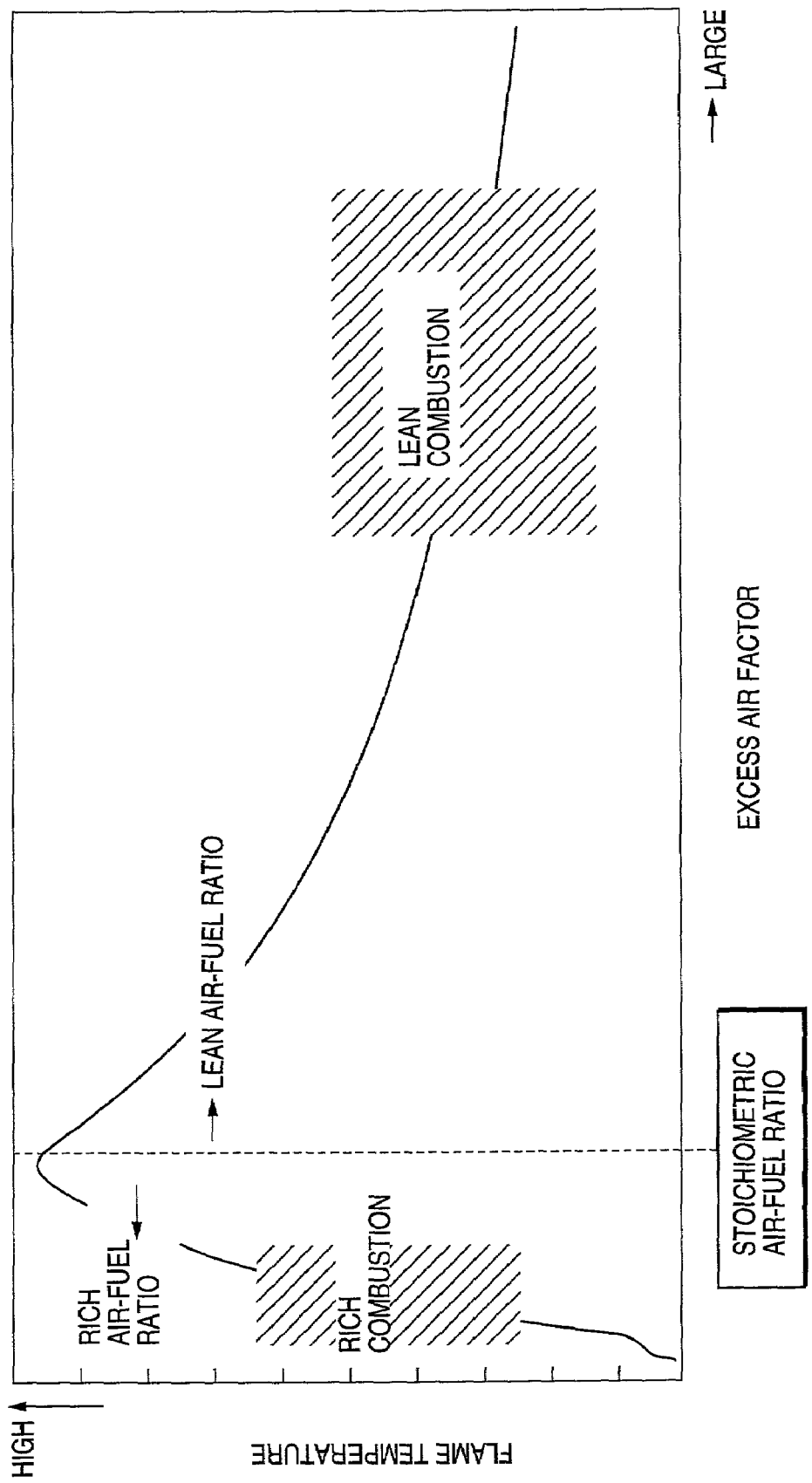
FIG. 4 is a diagram describing a relation between an excess air factor and a flame temperature when fuel is burnt in the start-up combustor.

Next, the setting of the mixing ratio of methanol and air supplied to the start-up combustor 4 will be described referring to FIG. 4.

When a lean gaseous mixture having a larger air amount than the stoichiometric mixing ratio, is burnt, there are practically no combustible components in the combustion gas. On the other hand, when a rich gaseous mixture having a smaller air amount than the stoichiometric mixing ratio is burnt, there are combustible components in the combustion gas. The combustible components have a correlation with flame temperature. For example, when the flame temperature is 900° C., approximately 25 vol % hydrogen and approximately 15 vol % carbon monoxide are present in the combustion gas.

When the power plant starts up, as the reformer 1 is not fully functional, the combustible components contained in the reformate gas are low. However, when the start-up combustor 4 supplies combustion gas resulting from combustion of a rich air-fuel mixture to the carbon monoxide oxidizer 3, the combustible components in the mixed gas supplied to the carbon monoxide oxidizer 3 can be increased. The increased combustible components undergo an oxidation reaction with the air supplied from the air supply valve 18 due to the action of the oxidation catalyst of the oxidation catalyst unit, and the temperature of the catalyst unit increases due to the heat of oxidation. Due to the enrichment of the mixing ratio of methanol and air supplied by the start-up combustor 4, activation of the carbon monoxide oxidizer 3 occurs even earlier.

Next, the control routine for supplying the mixed gas to the carbon monoxide oxidizer 3 performed by the microprocessor 30 will be described referring to FIGS. 5 and 6. The microprocessor 30 comprises a central processing unit (CPU), read-only memory (ROM), random access memory (RAM) and input/output interface (I/O interface).

This routine is performed when the power plant starts up, and terminates when the temperature of the catalyst unit in the carbon monoxide oxidizer 3 reaches a predetermined temperature of 100° C.

First, in a step S1, the microprocessor 30 starts the start-up combustor 4. Specifically, the fuel pump 20 and compressor 7 are operated, and an ignition signal is output to the glow plug 9.

In a next step S2, the temperature of the carbon monoxide oxidizer 3 is read by the temperature sensor 25.

Figure 6:
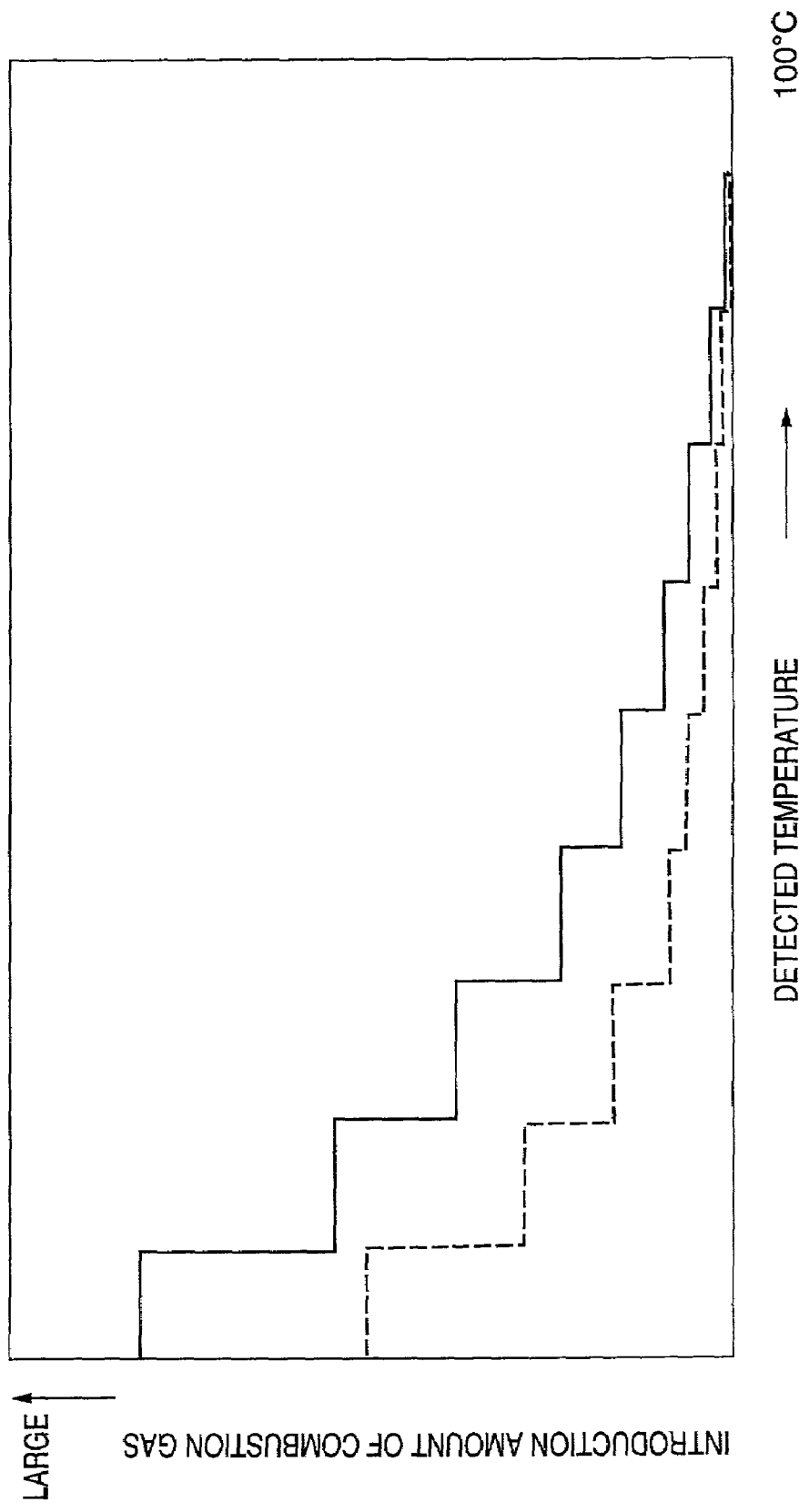
FIG. 6 is a diagram showing the contents of a map of combustion gas introduction amount stored by the microprocessor according to this invention.

In a step S3, the introduction amount of combustion gas to the passage 40 from the start-up combustor 4 is determined from the temperature of the catalyst unit, referring to a map shown in FIG. 6 which is prestored in the microprocessor 30. Herein, the map is represented by a solid line. In this map, the introduction amount of the gas is set to be larger the lower the temperature of the catalyst unit, and decrease as the temperature rises. When the catalyst temperature reaches 100° C., the introduction amount of combustion gas is zero. In FIG. 6, the introduction amount of combustion gas varies in a stepwise fashion, but the introduction amount of combustion gas can also be made to vary as a smooth curve with respect to the catalyst temperature, and the introduction amount of combustion gas controlled more finely.

In a step S4, the opening of the combustion gas supply valve 10 is increased or decreased so as to obtain the determined combustion gas introduction amount.

In a step S5, it is determined whether or not the catalyst temperature has reached the predetermined temperature of 100° C. This temperature corresponds to the lower limit of the activation temperature of the catalyst unit in the carbon monoxide oxidizer 3. When the catalyst temperature has reached 100° C., the combustion gas supply valve 10 is closed and the routine is terminated in a step S6.

If on the other hand the catalyst temperature has not reached 100° C. in the step S5, the routine repeats the processing of the steps S2–S4.

Hence, after the power plant has started up, the combustion gas of the start-up combustor 4 is supplied to the passage 40 until the catalyst temperature reaches the predetermined temperature of 100° C.

Figure 7:
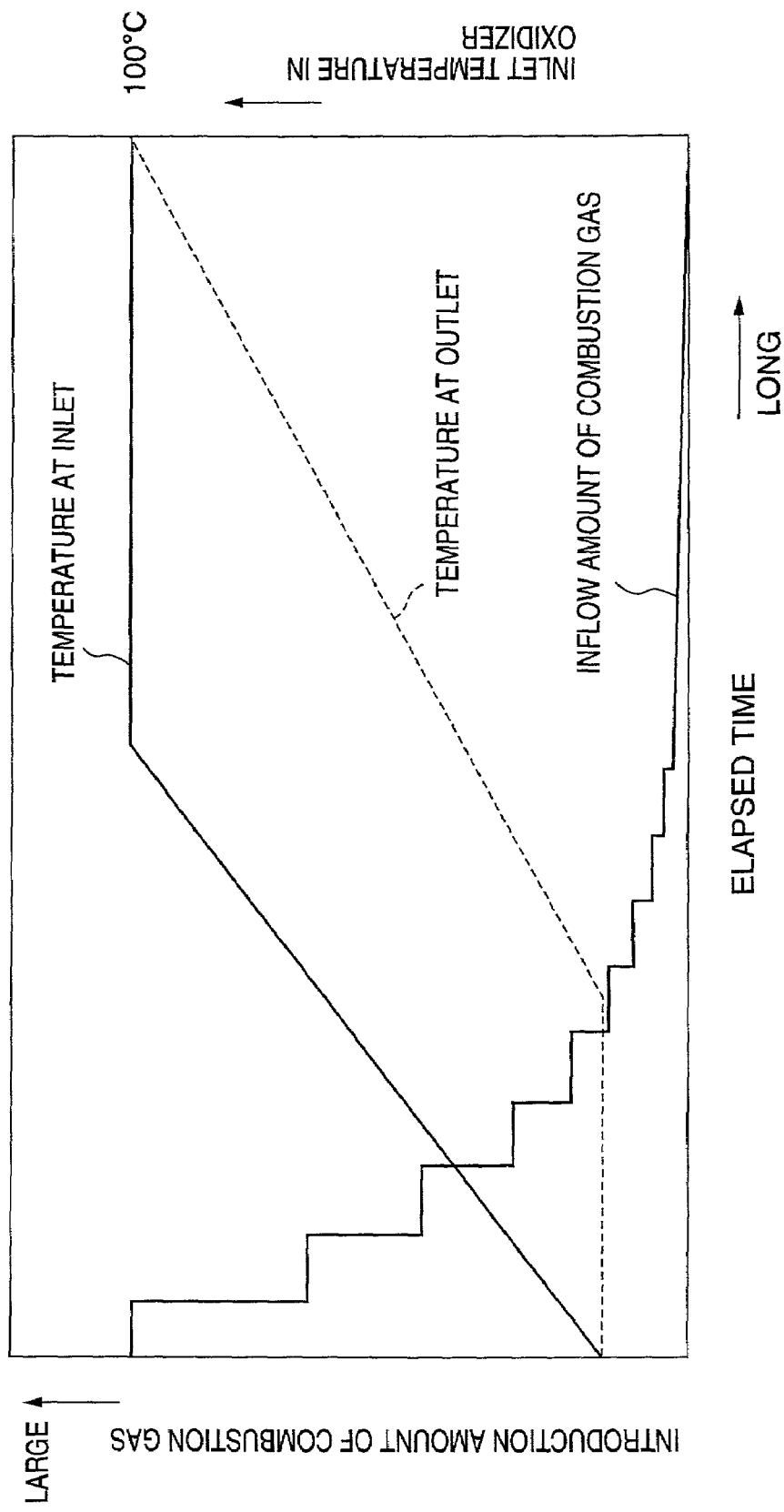
FIG. 7 is a diagram describing a temperature variation in the carbon monoxide oxidizer under a control of combustion gas introduction amount by the microprocessor.

Next, the temperature variation in the carbon monoxide oxidizer 3 under this control will be described referring to FIG. 7.

When the combustion gas is introduced, in the carbon monoxide oxidizer 3, the temperature of the upstream end of the catalyst unit which is close to an inlet of the carbon monoxide oxidizer 3 first rises and reaches the activation temperature. However, the temperature of the lower end of the catalyst unit which is close to an outlet of the carbon monoxide oxidizer 3, rises and reaches the activation temperature with a certain delay. The reason for this delay is that the oxidation reaction of the combustible components of the mixed gas begins in the vicinity of the inlet of the carbon monoxide oxidizer 3, and gradually moves downstream.

Figure 8:
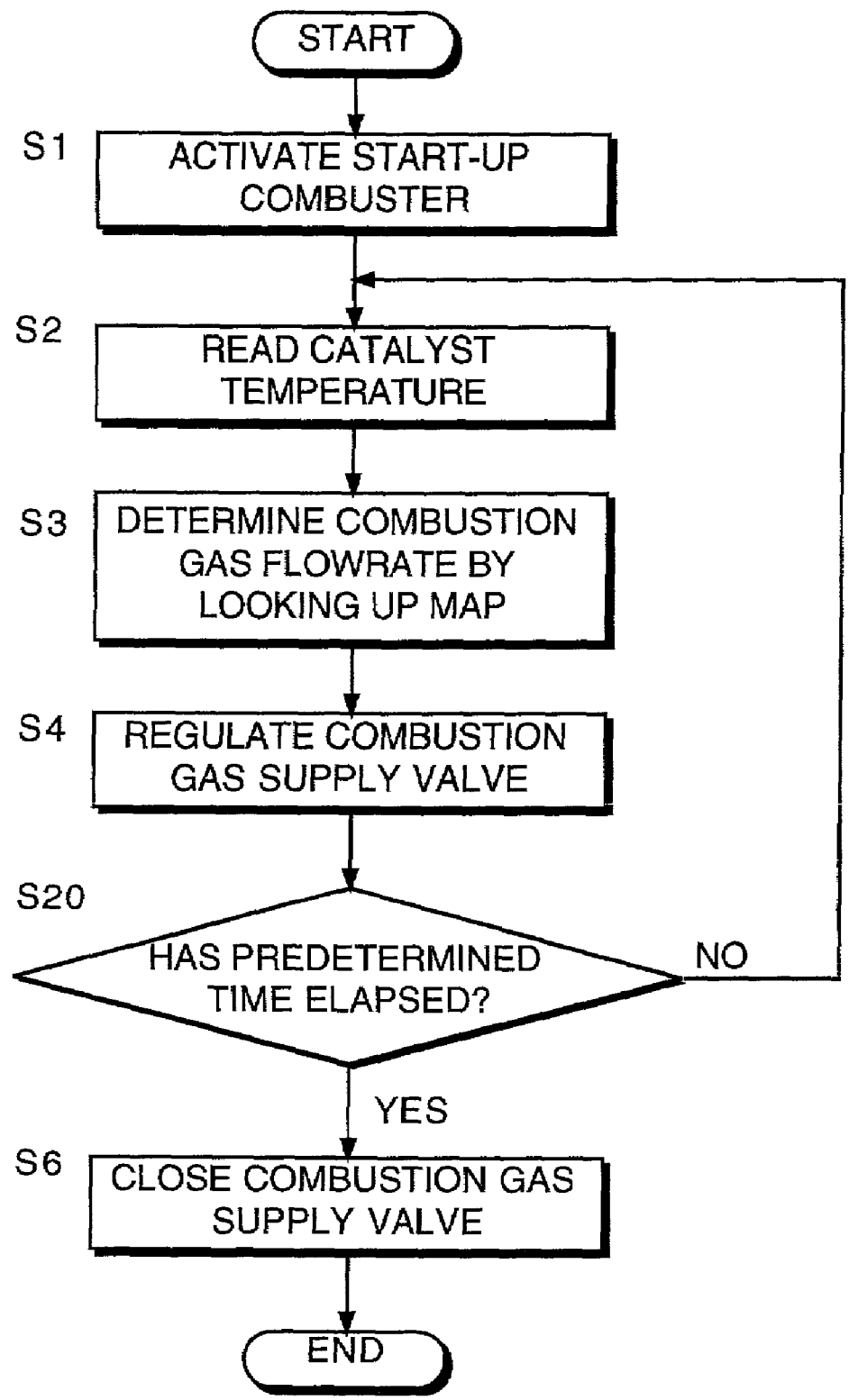
FIG. 8 is similar to FIG. 5, but showing a second embodiment of this invention.

Next, a second embodiment of this invention relating to a routine for supplying and controlling the mixed gas to the carbon monoxide oxidizer 3 will be described referring to FIG. 8.

Figure 5:
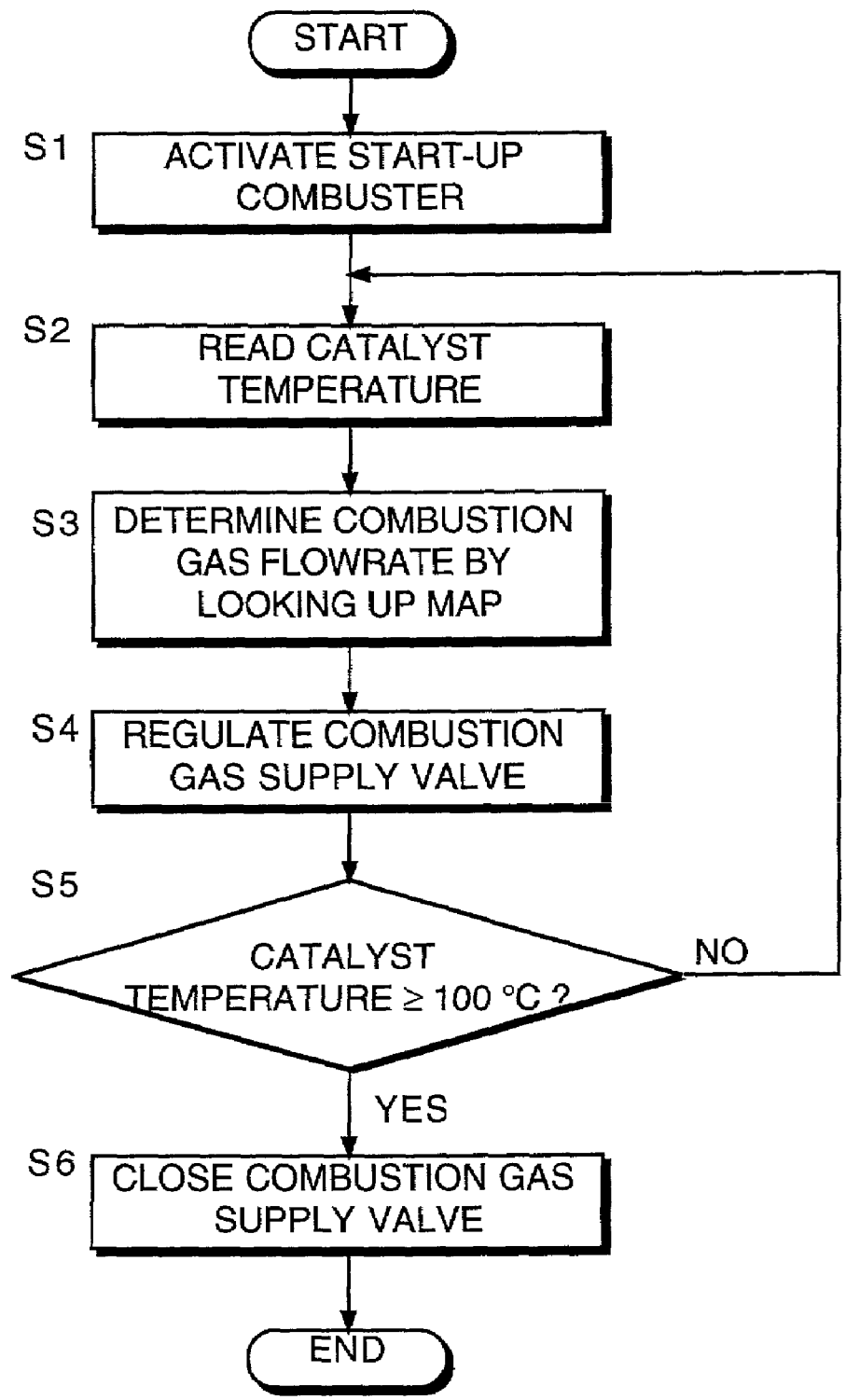
FIG. 5 is a flowchart describing a routine for controlling a combustion gas introduction amount performed by a microprocessor according to this invention.

In this embodiment, a step S20 is provided instead of the step S5 of FIG. 5 of the first embodiment. The remaining features of the construction are identical to those of the first embodiment.

In the step 20, it is determined whether or not a predetermined time has elapsed after startup of the power plant, and processing from the step S2 to the step S4 is repeated until the predetermined time has elapsed. In this way, supply of mixed gas to the carbon monoxide oxidizer 3 may be stopped after a certain time has elapsed after startup. In this embodiment also, the combustion gas introduction amount is determined using the same map as that of the first embodiment, so after the catalyst temperature has reached 100° C., the introduction of combustion gas is effectively stopped even if the elapsed time from startup is within the predetermined time interval.

Next, a third embodiment of this invention will be described referring to FIGS. 9 to 12.

According to this embodiment, the introduction amount of combustion gas is controlled based on the temperature of the passage 40 detected by the temperature sensor 26, and the introduction amount of air to the passage 40 is controlled based on the catalyst temperature detected by the temperature sensor 25.

Figure 9:
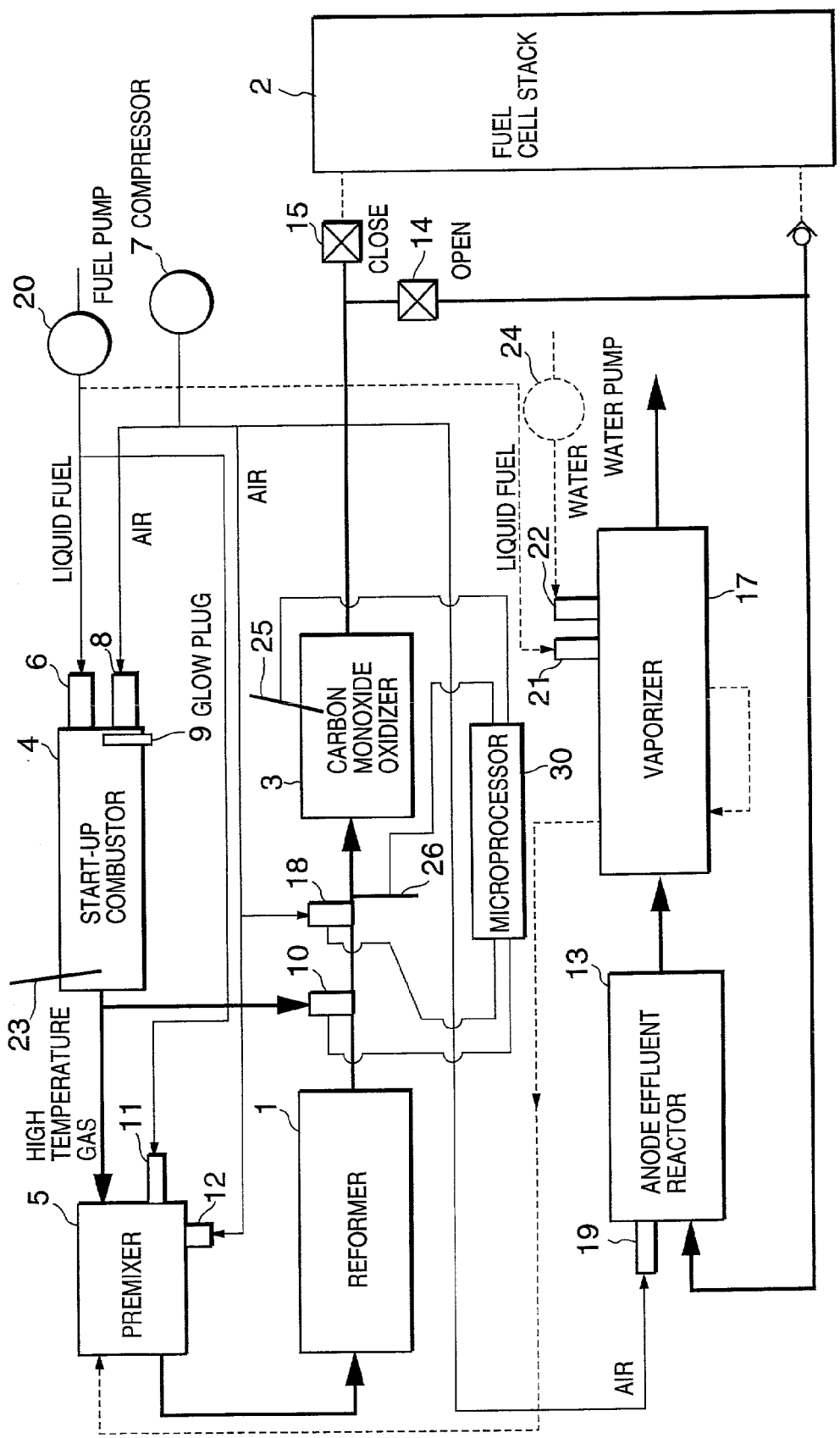
FIG. 9 is similar to FIG. 1, but showing a third embodiment of this invention.

For this purpose, the temperature of the passage 40 detected by the temperature sensor 26 is input to the microprocessor 3, as shown in FIG. 9.

Next, routines for controlling mixed gas supply performed by the microprocessor 30 will be described referring to FIGS. 10A and 10B. The routines of FIGS. 10A and 10B are performed in parallel immediately after the activation of the start-up combustor 4, and is terminated when the temperature of the catalyst unit in the carbon monoxide oxidizer 3 reaches the predetermined temperature of 100 C.

Figure 10A:
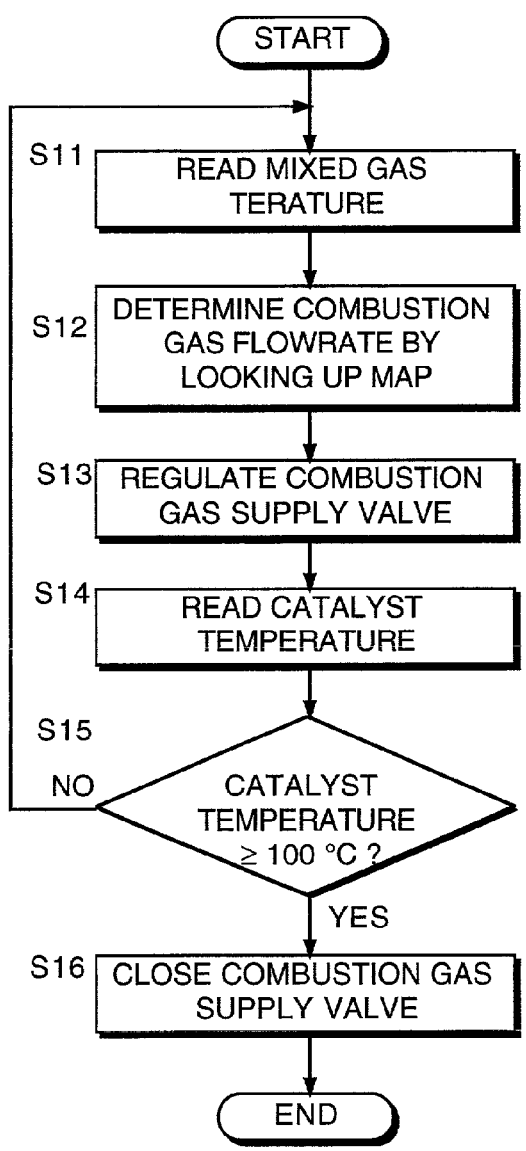
FIGS. 10A and 10B are flowcharts describing routines for controlling the combustion gas introduction amount and an air introduction amount performed by a microprocessor according to the third embodiment of this invention.
Figure 10B:
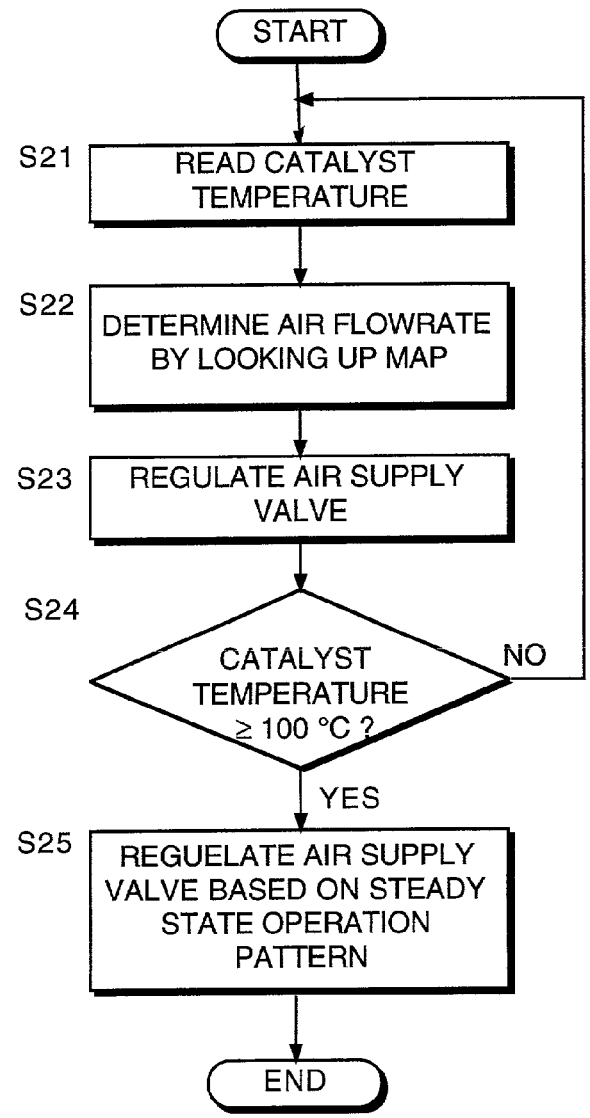

Referring first to FIG. 10A, the microprocessor 30 controls the introduction amount of combustion gas by performing the processing of steps S11 through S16.

First, in the step S11, the temperature of the mixed gas in the passage 40 detected by the temperature sensor 26 is read.

In the step S12, the introduction amount of combustion gas to the passage 40 is determined from the temperature of the mixed gas, referring to a map shown by a dotted line in FIG. 6 which is prestored in the microprocessor 30. Although the map is shown in the same figure as the map for the first and second embodiment, this embodiment is represented by a dotted line while the first and second embodiment are represented by the solid line. In the step S13, the opening of the combustion gas supply valve 10 is increased or decreased to obtain the desired combustion gas introduction amount.

In the step 14, the temperature of the catalyst unit in the carbon monoxide oxidizer 3 detected by the temperature sensor 25 is read.

In the step 15, it is determined whether or not the catalyst temperature has reached the predetermined temperature of 100 C. This determination is identical to the determination of the step S5 in the first embodiment. When the catalyst temperature has reached 100 C, the combustion gas supply valve 10 is closed in the step S16 and the routine is terminated. When the catalyst temperature has not reached 100 C, the routine repeats the processing of the steps S11 through S14.

Referring now to FIG. 10B, the microprocessor 30 controls the introduction amount of air by performing the processing of steps S21 through S25. First, in the step S21, the temperature of the catalyst unit in the carbon monoxide oxidizer 3 detected by the temperature sensor 25 is read.

Figure 11:
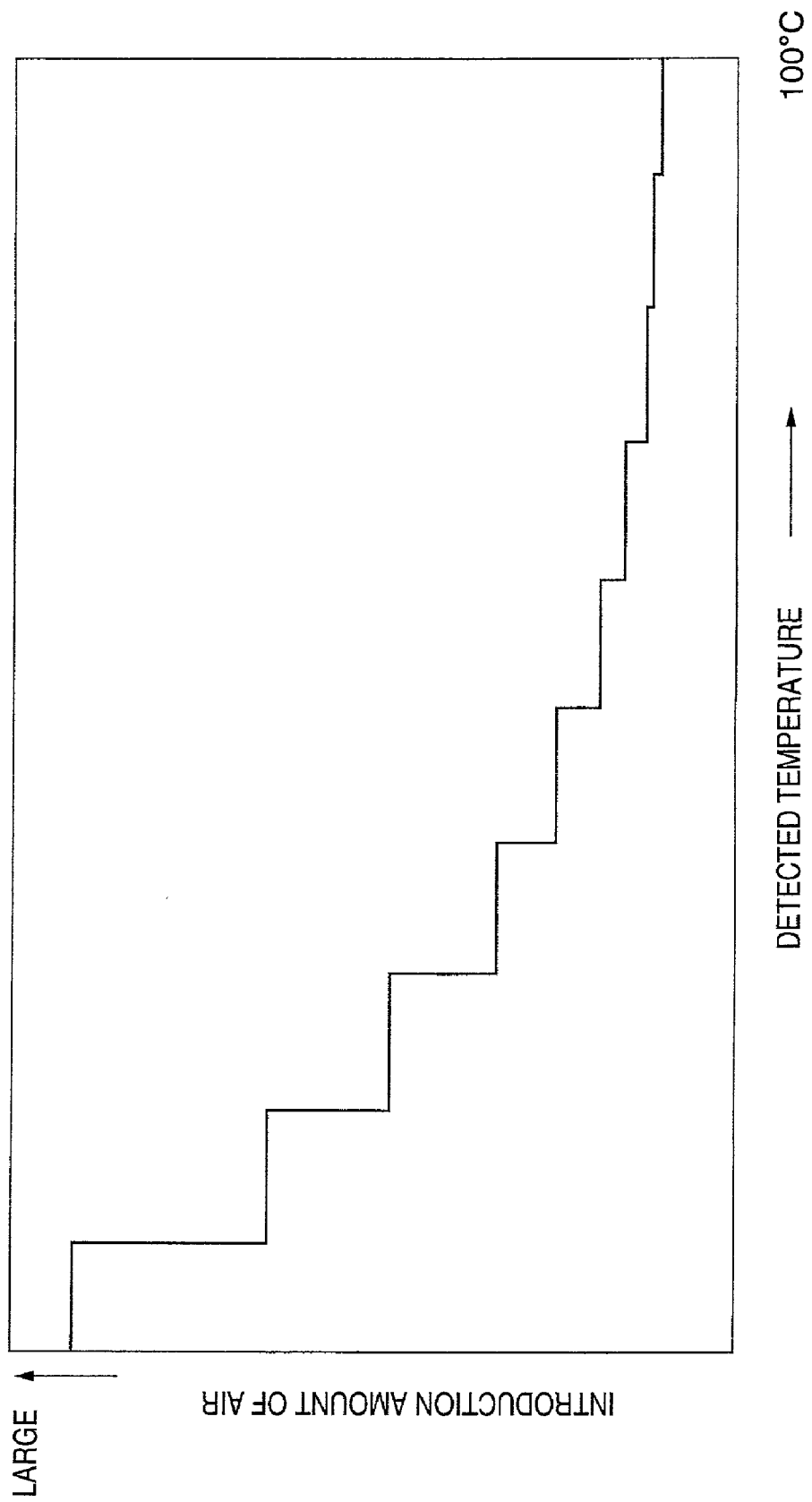
FIG. 11 is a diagram describing the contents of a map of air introduction amount stored by the microprocessor according to the third embodiment of this invention.

In the step 22, the introduction amount of air by the air supply valve 18 is determined from the catalyst unit temperature by looking up a map shown in FIG. 11 which is prestored in the microprocessor 30. In this map, the introduction amount of air to the passage 40 is set to be larger when the temperature of the catalyst unit is low, and decrease as the temperature rises.

However, the introduction amount of the air to the passage 40 is set so that a certain amount of air is introduced even after the catalyst temperature has reached 100° C.

In the step 23, the opening of the air supply valve 18 is increased or decreased so as to obtain the determined air introduction amount.

In the step 24, it is determined whether or not the catalyst temperature has reached the predetermined temperature of 100° C. as in the step S15.

When the catalyst temperature has reached 100° C., the combustion gas supply valve 10 is set to a steady state running position in the step S25 and the routine is terminated. When the catalyst temperature has not reached 100° C., the routine repeats the processing of the steps S21 through S23.

In the above routine, the combustion gas introduction amount is determined based on the temperature of the mixed gas in the passage 40, and the air introduction amount is determined based on the temperature of the catalyst unit in the carbon monoxide oxidizer 3. The introduction of the air to the passage 40 promotes the oxidation reaction in the carbon monoxide oxidizer 3 thereby causing a temperature increase of the catalyst unit, but at the same time also has the effect of lowering the temperature of the mixed gas. According to this embodiment, due to the control of the combustion gas introduction amount, the temperature of mixed gas is maintained within a suitable range, and consequently, the combustion gas introduction amount and air introduction amount are properly combined so that the temperature of the catalyst unit rises in a short time.

Figure 12:
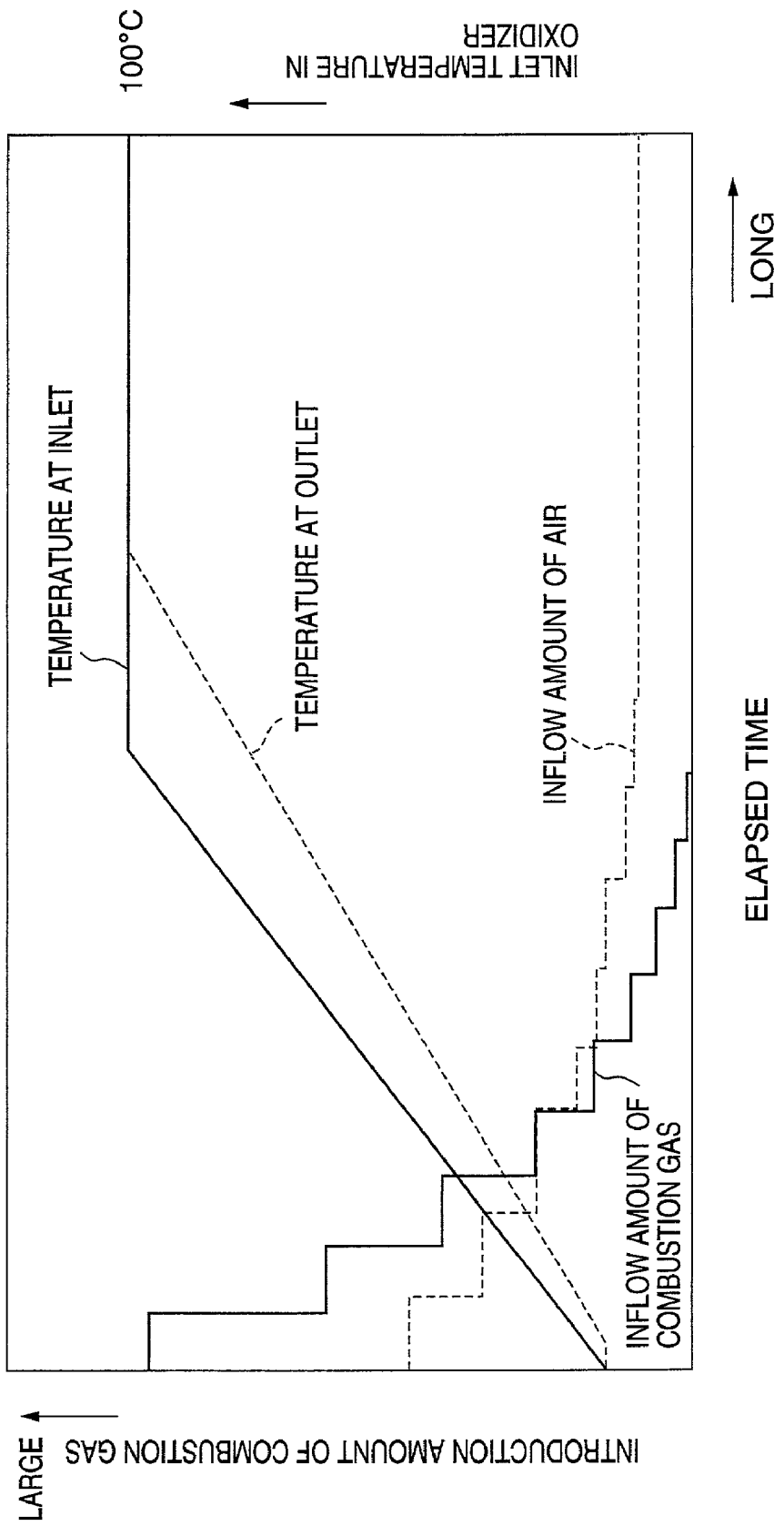
FIG. 12 is a diagram describing a temperature variation in the carbon monoxide oxidizer under the control of combustion gas introduction amount and air introduction amount by the microprocessor according to the third embodiment of this invention.

FIG. 12 shows the temperature variation in the carbon monoxide oxidizer 3 according to this embodiment. In this embodiment also, as in the case of the first embodiment, the temperature of the upstream end of the catalyst unit close to the inlet of the carbon monoxide oxidizer 3 first rises, and the temperature of the downstream end of the catalyst unit rises later. However, in this embodiment, the air introduction amount is varied according to the temperature of the catalyst unit, so the range of the delay in the temperature rise can be made smaller than in the first or second embodiment. Therefore, the catalyst unit in the carbon monoxide oxidizer 3 can be activated more effectively.

To enhance the carbon monoxide oxidation performance, plural carbon monoxide oxidizers may be provided in series instead of the single carbon monoxide oxidizer 3 downstream of the reformer 1. If this invention is applied to such a hydrogen-rich gas supply device, the combustion gas supply valve 10 and air supply valve 18 may be disposed separately upstream of each of the carbon monoxide oxidizers and the temperature sensors may also be provided for each carbon monoxide oxidizer. The introduction amounts of combustion gas and air are then controlled for each of the carbon monoxide oxidizers. Due to this construction, the ability to oxidize carbon monoxide from the reformate gas can be enhanced.

The contents of Tokugan 2000-276342, with a filing date of Sep. 12, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, the control of the combustion gas introduction amount is performed by the single microprocessor 30, but it may be performed by plural microprocessors. The control of the air introduction amount may also be performed by using plural microprocessors.

The fuel supplied to the start-up combustor 4 is not limited to methanol but other fuel containing hydrocarbon such as gasoline may be used instead.

The embodiments of this invention in which an exclusive property or privilege is claimed are defined as follows:

1. A hydrogen-rich gas supply device for supplying hydrogen-rich gas to a fuel cell stack, comprising:
   a reformer which generates reformate gas comprising hydrogen from fuel;
   a carbon monoxide oxidizer comprising a catalyst which oxidizes carbon monoxide contained in the reformate gas;
   an oxidizing agent supply mechanism which supplies an oxidizing agent to the carbon monoxide oxidizer;
   a start-up combustor which promotes combustion of a gaseous mixture of hydrocarbon and air having a richer mixing ratio than a stoichiometric mixing ratio, the richer mixing ratio corresponding to a state where an amount of hydrocarbon in the mixture is greater than an amount of hydrocarbon which can be burned with an amount of air in the mixture, to generate a hot gas comprising combustible components and supplies the hot gas to the carbon monoxide oxidizer;
   a sensor which detects a temperature of the catalyst; and
   a controller functioning to:
   determine whether or not the temperature of the catalyst is higher than a predetermined temperature, and
   stop the start-up combustor supplying hot gas to the carbon monoxide oxidizer when the catalyst temperature is higher than the predetermined temperature.

2. The hydrogen-rich gas supply device as defined in claim 1, wherein the controller further functions to control the start-up combustor, when the temperature of the catalyst is lower than the predetermined temperature, to decrease an amount of hot gas supplied to the carbon monoxide oxidizer as the temperature of the catalyst increases.

3. The hydrogen-rich gas supply device as defined in claim 1, wherein the hydrogen-rich gas supply device further comprises a passage which supplies a mixture of the reformate gas, the oxidizing agent and the hot gas to the carbon monoxide oxidizer, and a sensor which detects a temperature of the mixture in the passage, and the controller further functions to control the start-up combustor, when the temperature of the catalyst is lower than the predetermined temperature, to decrease an amount of hot gas supplied to the carbon monoxide oxidizer as the temperature of the mixture increases.

4. The hydrogen-rich gas supply device as defined in claim 3, wherein the controller further functions to control the oxidizing agent supply mechanism to decrease an amount of oxidizing agent supplied to the carbon monoxide oxidizer as the temperature of the catalyst increases.

5. The hydrogen-rich gas supply device as defined in claim 1, wherein the catalyst comprises a noble metal and alumina, and the predetermined temperature is set equal to a temperature at which the catalyst is activated.

6. The hydrogen-rich gas supply device as defined in claim 1, wherein the oxidizing agent supply mechanism comprises a mechanism which supplies air to the carbon monoxide oxidizer.

7. A hydrogen-rich gas supply device for supplying hydrogen-rich gas to a fuel cell stack, comprising:
   a reformer which generates reformate gas comprising hydrogen from fuel;
   a carbon monoxide oxidizer comprising a catalyst which oxidizes carbon monoxide contained in the reformate gas;
   an oxidizing agent supply mechanism which supplies an oxidizing agent to the carbon monoxide oxidizer;
   a start-up combustor which promotes combustion of a gaseous mixture of hydrocarbon and air having a richer mixing ratio than a stoichiometric mixing ratio, the richer mixing ratio corresponding to a state where an amount of hydrocarbon in the mixture is greater than an amount of hydrocarbon which can be burned with an amount of air in the mixture, to generate a hot gas comprising combustible components and supplies the hot gas to the carbon monoxide oxidizer;
   means for detecting a temperature of the catalyst;
   means for determining whether or not the temperature of the catalyst is higher than a predetermined temperature; and
   means for stopping the start-up combustor supplying hot gas to the carbon monoxide oxidizer when the catalyst temperature is higher than the predetermined temperature.

* * * * *